US005811227A

United States Patent [19]

Gandasasmita et al.

[11] Patent Number: 5,811,227

[45] Date of Patent: Sep. 22, 1998

[54] METHOD FOR DISPERSING DROPLET TYPE EMULSIFIED MATERIAL WITHIN LIQUID FEEDING SYSTEM AND COATING METHOD USING THE DISPERSING METHOD

[75] Inventors: Iskandar Gandasasmita; Fuyuhiko Mori; Kazuya Sano, all of Tilburg; Johannes A.W. van Engelen, Vlijmen, all of Netherlands

[73] Assignee: Fuji Photo Film Co., Ltd., Kanagawa, Japan

[21] Appl. No.: 728,039

[22] Filed: Oct. 9, 1996

[30] Foreign Application Priority Data

Oct. 9, 1995 [NL] Netherlands .......................... 1001380

[51] Int. Cl.$^{6}$ ............................ B01J 13/00; G03C 1/00; G03C 1/74

[52] U.S. Cl. ...................... 430/495.1; 252/312; 252/314; 430/935

[58] Field of Search .................................. 252/312, 314; 430/569, 935, 495.1

[56] References Cited

U.S. PATENT DOCUMENTS

| | | | |
|---|---|---|---|
| 3,031,304 | 4/1962 | Oliver | 430/569 X |
| 4,116,696 | 9/1978 | Tatsuta et al. | 252/312 X |
| 4,183,681 | 1/1980 | Li et al. | 366/336 |
| 4,336,328 | 6/1982 | Brown et al. | 430/569 |
| 4,349,455 | 9/1982 | Yamamura et al. | 252/312 |
| 5,024,929 | 6/1991 | Lougheed et al. | 430/546 |
| 5,326,484 | 7/1994 | Nakashima et al. | 252/314 |
| 5,339,875 | 8/1994 | English et al. | 430/347 X |

FOREIGN PATENT DOCUMENTS

| | | | |
|---|---|---|---|
| 0107559A1 | 10/1983 | European Pat. Off. | A61K 9/50 |
| 4-229852 | 8/1992 | Japan | G03C 1/00 |
| 2046932 | 3/1980 | United Kingdom | G03C 1/06 |
| WO 86/00238 | 1/1986 | WIPO | B01D 13/00 |
| WO 94/08620 | 4/1994 | WIPO | A61K 49/00 |

OTHER PUBLICATIONS

Perry et al.: *Chemical Engineers' Handbook*, Fifth Edition, McGraw–Hill, Inc., New York (1973) pp. 19–61 Through 19–63. [TP 155 p. 4 5#ED. 1973].

*Primary Examiner*—Richard D. Lovering

*Attorney, Agent, or Firm*—Sughrue, Mion, Zinn, Macpeak & Seas, PLLC

[57] ABSTRACT

A dispersing method carried out in a liquid feeding system includes passing a dispersing medium containing an oil droplet type emulsified material at a flow rate of not less than 5 cc/cm$^2$.min through a filter with a plurality of pores having such a size as to permit an oil droplet type emulsified material having a predetermined particle diameter to pass therethrough to reduce the size of the coarse particles of the oil droplet type emulsified material to below a predetermined particle diameter. The dispersing method is particularly suitable for use in the production of photographic layers.

14 Claims, 4 Drawing Sheets

Dp : AVERAGE DIAMETER OF OIL DROPLETS AFTER FILTRATION/ AVERAGE DIAMETER OF OIL DROPLETS BEFORE FILTRATION

Np : NUMBER OF OIL DROPLETS AFTER FILTRATION/ NUMBER OF OIL DROPLETS BEFORE FILTRATION

METHOD FOR DISPERSING DROPLET TYPE EMULSIFIED MATERIAL WITHIN LIQUID FEEDING SYSTEM AND COATING METHOD USING THE DISPERSING METHOD

BACKGROUND OF THE INVENTION

1. Field of the invention

The present invention relates to a method for dispersing an oil droplet type emulsified material in a dispersing medium within a liquid feeding system and to a coating method using the dispersing method. More particularly, the present invention relates to the homogenization of the diameter of an oil droplet type emulsified material in a dispersing medium.

2. Description of the Related Art

A hydrophobic substance present as an oil droplet type emulsified material in a dispersing medium has hitherto been utilized in a wide variety of fields including photographic materials, cosmetics, foods, chemicals, and pressure sensitive papers. This hydrophobic substance usually serves as an effective ingredient in these applications. For example, in the case of a photographic material, effective ingredients include a color image forming compound (a coupler), a diffusion transfer compound, a color fog preventive, a color fading preventive, a color mixing preventive, an ultraviolet absorber, and a brightening agent.

An oil droplet emulsified material is prepared from the hydrophobic substance in a dispersing medium as follows. When the hydrophobic substance is liquid, an oil-phase solution is prepared from the hydrophobic substance per, se or if necessary together with an organic solvent or together with an emulsifying aid or a solution of an emulsifying aid dissolved in an organic solvent. On the other hand, when the hydrophobic substance is solid, an oil-phase solution is usually prepared by dissolving the hydrophobic substance in an organic solvent or by dissolving the hydrophobic substance, together with an emulsifying aid, in an organic solvent. Thereafter, the oil-phase solution is added to and dispersed in a water-phase solution of a water-soluble binder optionally containing an emulsifying aid. Thus, an oil droplet type emulsified material having an average diameter in the range of about 0.01 to 200 $\mu$m is prepared.

In the case of a photographic material (for example, a coupler) the above emulsification is carried out mainly in an apparatus as shown in FIG. 6 or 7 which is disclosed in U.S. Pat. No. 4,349,455.

Specifically, in FIGS. 6 and 7, at the outset, a coupler or a coupler together with an emulsifying aid is mixed and dissolved in an organic solvent in a first tank 21 equipped with a propeller agitator 23 having a relatively simple structure, thereby preparing a coupler solution in an oil phase. Separately, an aqueous solution of a hydrophilic colloid, for example, an aqueous solution of gelatin or an aqueous solution of gelatin and an emulsifying aid is prepared in a second tank 22 equipped with a propeller agitator 24. Thereafter, the coupler solution prepared in the first tank 21 is added to and mixed with the aqueous gelatin solution contained in the second tank 22 (see FIG. 6), or alternatively, the coupler solution and the aqueous gelatin solution are poured simultaneously into and mixed together in a third tank 26 equipped with a propeller agitator 27 (see FIG. 7), thereby forming oil droplets in water in water. The oil droplets are further treated in an emulsifier 25, such as a colloid mill, a homogenizer, or a mixer, to bring the diameter of the coupler droplets as a dispersed phase to a desired level, thus carrying out emulsification to prepare an aqueous coating solution to be coated as a photographic layer onto a base material.

The average diameter of the oil droplets can be varied by properly selecting the type of the above emulsifier 25 and the number of emulsification treatments using the emulsifier 25.

In the preparation of the above aqueous coating solution containing oil droplets, however, the occurrence of coarse particles cannot always be prevented, and, further, the diameter of the oil droplet, in some cases, increases with time.

In particular, for a photographic material, the following problems occur. When an emulsion containing an unexpectedly large oil droplet having a much larger diameter than a desired average diameter is coated as a photographic layer, a defect called an "oil spot" occurs in an image area.

For example, the presence of an oil droplet having a diameter of 100 $\mu$m, which is only present in a very small proportion compared to those with an average diameter of 0.2 $\mu$m, appears as a spot in the resultant image. For this reason, in order to prevent the occurrence of the above defect, the oil droplet having a much larger diameter than the average diameter should be removed or dispersed to a reduced size prior to coating.

For an aqueous gelatin solution used in a conventional photographic material, dispersion using agitation or shearing at a high speed or for a long period of time is considered effective as dispersing means.

However, since the oil droplet having such a large particle diameter occupies only a small proportion, a several fold increase in energy beyond that actually needed for further dispersing the large oil droplet becomes necessary for accomplishing the further dispersion purpose. moreover, applying this method, large oil droplets cannot be surely dispersed to a desired size without a risk of failure. Further, an attempt to remove such large oil droplets by filtering them off leads to a loss of useful product and, in addition, to a change in the composition of the coating solution.

Furthermore, once dispersed and refined, particles might in some cases coalesce to coarse particles, which is the cause of unfavorable results at the time of feeding and coating of the coating solution. Therefore, the development of a simple, efficient and reliable method for removing coarse particles has been desired in the art for many years.

SUMMARY OF THE INVENTION

An object of the present invention is to solve the above problem and to provide a method for dispersing oil droplets in a dispersing medium, which method enables the diameter of oil droplets to be made more homogeneous at low cost and without affecting the useful small oil droplets, and a coating method utilizing the dispersing method.

The above and other objects can be obtained by passing a dispersing medium containing an oil droplet type emulsified material at a flow rate of not less than 5 $cc/cm^2$.min through a filter with a plurality of pores having such a size as to permit an oil droplet type emulsified material having a predetermined diameter to pass therethrough, thereby dispersing the oil droplet type emulsified material to a reduced size.

The dispersing medium may be an aqueous gelatin solution.

Further, the above dispersing method can be used before coating in the production of a photographic material. This coating method may be carried out by passing a dispersing medium, containing oil droplets used for a photographic material, at a flow rate of not less than 5 cc/cm$^2$.min through a filter with a plurality of pores having such a size as to permit an oil droplet type emulsified material having a predetermined diameter to pass therethrough, thereby reducing the diameter of the coarse particles of the oil droplet type emulsified material below a predetermined particle diameter, and coating the dispersing medium, which has been passed through the filter, onto a base for the photographic material.

When oil droplets are fed into a filter at a flow rate of not less than 5 cc/cm$^2$.min, oil droplets having a larger diameter than a predetermined value are surely dispersed to a reduced diameter without any accumulation on the filter. In order to ensure such an effect, it is preferred to apply a pressure between 0.5 and 7.0 bar to the dispersing medium, but a higher pressure also can be applied.

In a photographic material, a coating solution from which oil droplets that cause oil spot troubles have been removed by dispersing them to a reduced size can be used to coat a photosensitive solution on a base for a photographic material.

Preferably, the filter has a porosity of not less than 90%. A suitable thickness of the filter is a thickness of at least 10 times the average diameter of the pores of the filter. The pores of the filter are preferably between 1 $\mu$m and 100 m, more preferably between 3 $\mu$m and 60 $\mu$m.

DETAILED DESCRIPTION OF THE PREFERRED EMBODIMENT

An apparatus used in the present invention will now be described with reference to FIG. 1.

Figure 1:
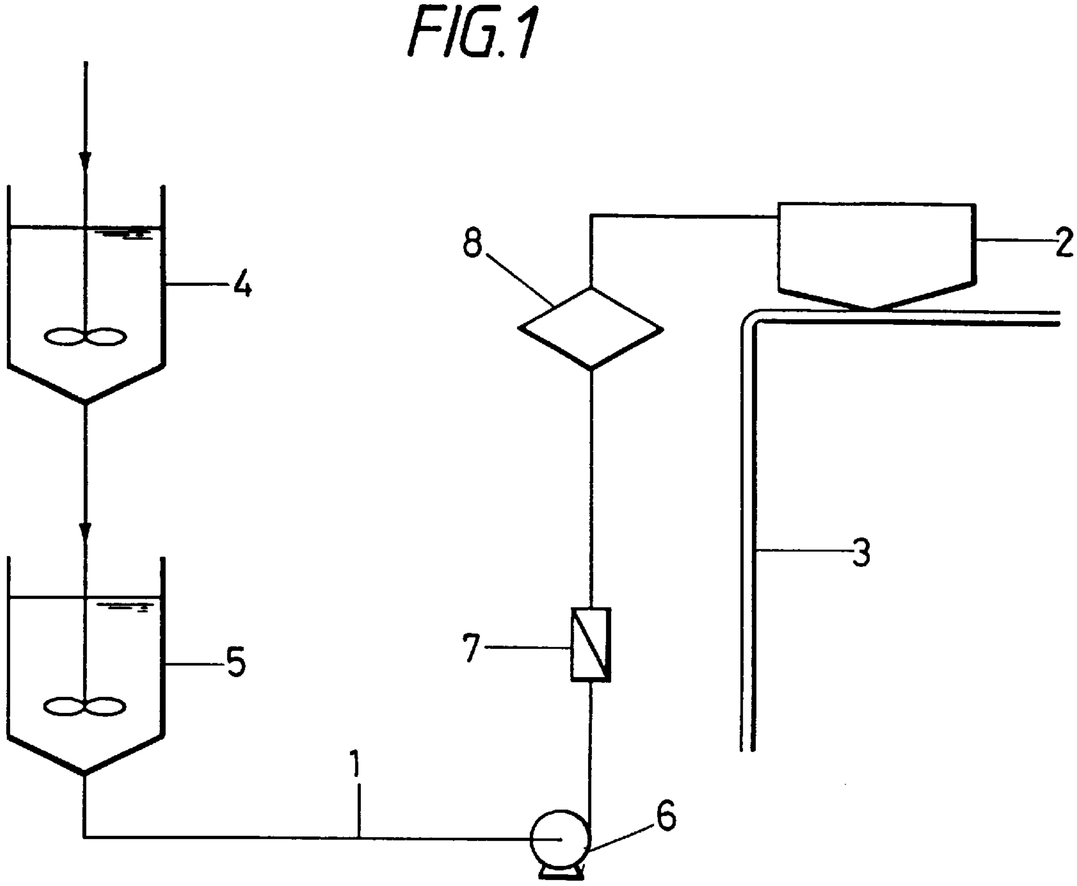
FIG. 1 is a schematic diagram illustrating the coating of a coating solution to which the dispersing method of the present invention has been applied.

FIG. 1 is a schematic diagram illustrating the coating of a coating solution, for a photographic material, to which the dispersing method according to the present invention has been applied.

An emulsion, for a photographic material, flowing through a passage 1 is coated as a coating solution onto a base 3 through a coating section 2. The base 3 comprises a support of paper or a synthetic material. A mixing tank 4, a storage tank 5, a pump 6, a known membrane filter 7, and a filter section 8 are provided in that order in the passage 1. In the mixing tank 4, a silver halide photographic solution is previously mixed with a suitable amount of gelatin and various additives. Examples of the additives include a coupler, a stabilizer, a preservative, and an emulsifying agent. Further, if necessary, a preset amount of water can be added. These additives are, in many cases, added in an emulsion form and, hence, often have an oil droplet diameter which is contemplated to be reduced by the dispersing method of the present invention.

Figure 2:
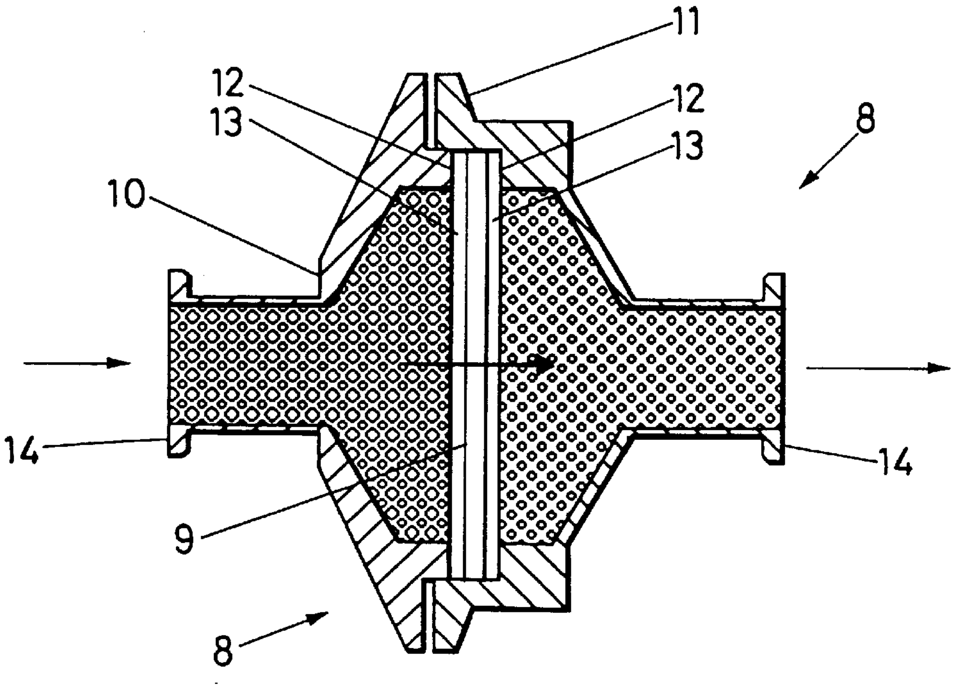
FIG. 2 is a schematic sectional view of a dispersing device used in an embodiment of the dispersing method according to the present invention.

Subsequently, the solution, which has been mixed and emulsified in the tank 4, is temporarily stored in the tank 5. At the time of use (coating), the solution is fed as a coating solution from the tank 5 into the membrane filter 7 by means of the pump 6. The membrane filter 7 serves to remove contaminants contained in the coating solution. The coating solution passed through the membrane filter 7 is then passes through a filter medium 9 (as shown in FIG. 2, which will be described later) within the filter section 8 provided in the passage 1. At that time, oil droplets having a larger diameter than a predetermined average diameter are dispersed to a reduced diameter after passing filter medium 9. The maximum diameter of oil droplets after the dispersing treatment is preferably not more than 30 $\mu$m, more preferably not more than 20 $\mu$m. The solution which has been subjected to the dispersing treatment by the filter medium 9 is, as described above, coated as a coating solution on the base 3 through the coating section 2.

FIG. 2 is a schematic sectional diagram showing a dispersing device (a filter section 8) used in an embodiment of the dispersing method according to the present invention. The filter section 8 comprises, two housing members 10, 11 coupled with each other, with a sealing 12. The housing members 10, 11 are connected to the passage 1 through a coupling member 14. Further, a filter medium 9 is disposed between the housing members 10, 11, with the filter medium 9 being sandwiched between ring members 13. A coating solution containing coarse oil droplets (up to 300 $\mu$m) is fed through the passage 1 into the filter section 8, where it is passed through the filter medium 9.

The filter medium 9 is preferably formed of a fiber material, for example, a sintered fiber material. Examples of the fibrous material include propylene. The fiber preferably comprises at least one of synthetic fibers, glass fibers, and cellulose fibers. The thickness of the filter medium 9 is preferably at least 10 times the average diameter of pores formed in the filter medium 9. A filter medium having a porosity of not less than 90% is best suited as the filter medium 9 used in the present invention. In the present invention, the porosity is represented by the proportion of the total surface area of pores to the unit area of the filter medium. The filtered particle size (a nominal value representing the size of coarse particles which can be removed by the filter medium, as specified in JIS-B8356) of the filter medium 9 is from 1 to 100 $\mu$m, preferably from 3 to 60 $\mu$m.

Figure 3:
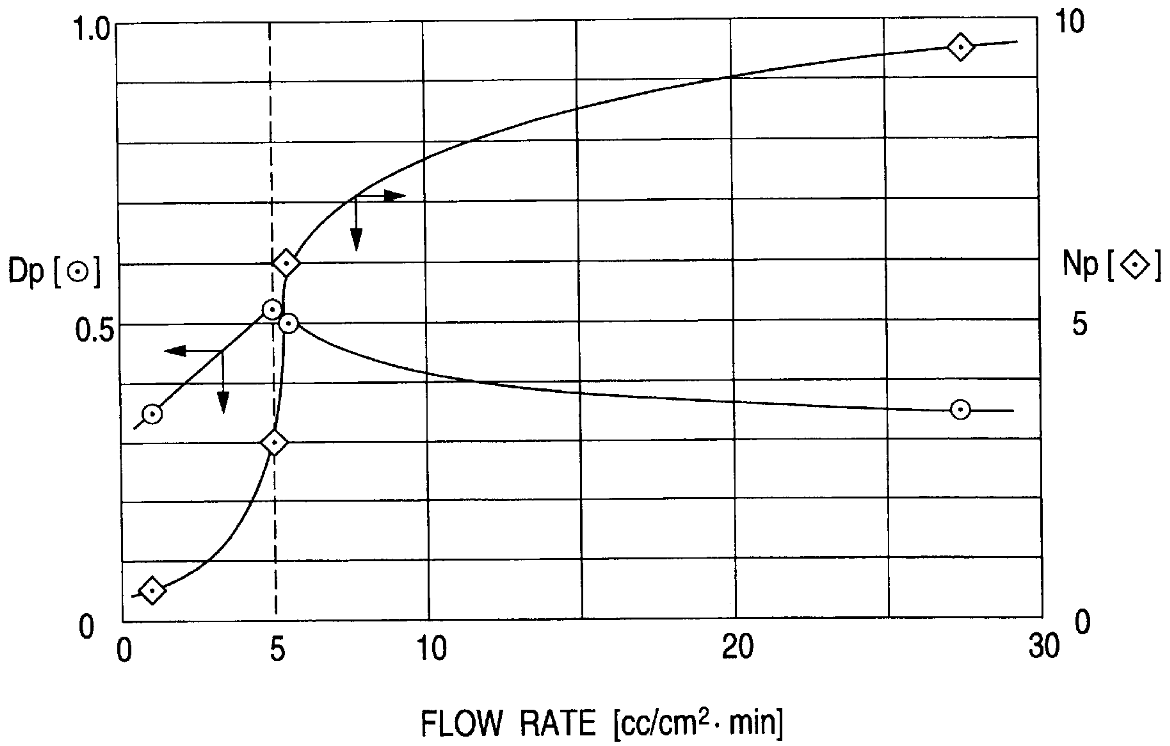
FIG. 3 is a graph showing the relationship between the amount of solution passed through a filter medium per unit sectional area of the filter medium and per unit time, with one side showing the ratio of the number of oil droplets after passing through the filter medium to the number of oil droplets before passing through the filter medium in a coating solution (Np), and with the other side showing the ratio of the average diameter of oil droplets after passing through the filter medium to the average diameter of oil droplets before passing through the filter medium (Dp)

FIG. 3 is a graph wherein the amount of filtrate passed through a filter medium per unit sectional area of the filter medium and per unit time (hereinafter referred to simply as "flow rate") is plotted as the abscissa against the ratios of two measuring parameters showing the state of a coating solution after filtration to the state before filtration. The two measuring parameters are as follows.

Np: Ratio of number of oil droplets=(number of oil droplets after filtration)/(number of oil droplets before filtration)

Dp: Average diameter ratio=(average diameter of oil droplets after filtration)/(average diameter of oil droplets before filtration)

As can be seen from the graph, the average diameter ratio Dp is lowered in a region of not less than 5 $cc/cm^2$.min in flow rate and shows that the average diameter of oil droplets after filtration is smaller than that before filtration. The ratio Np of number of oil droplets is rapidly increased with the flow rate 5 $cc/cm^2$.min as a critical value. This shows that the number of oil droplets after filtration is larger than that before filtration.

Therefore, it can be understood that, in a region of not less than 5 $cc/cm^2$.min in flow rate, the dispersion becomes vigorous, rendering the diameter of the oil droplets smaller and more homogeneous. The flow rate is more preferably not less than 10 $cc/cm^2$.min.

For example, when an emulsion containing oil droplets having a diameter of about 100 $\mu$m, with a pressure between about 0.5 and 7.0 bar applied thereto, is passed through the filter section 8 at the above mentioned flow rate, i.e., flow rate of not less than 5 $cc/cm^2$.min. the oil droplets having a large diameter are dispersed to a reduced size by the transfer through the porous material, and as described above, are finally reduced to diameter of not more than 30 $\mu$m, preferably not more than 20 $\mu$m. That means that oil droplets having a larger size than the pores of the filter medium 9 are surely dispersed to a reduced size without being collected on the filter, so that large oil droplets having such a large diameter as to cause oil spots are eliminated.

When the pore size of the filter medium 9 is excessively large, the possibility of large oil droplets being dispersed by the filter medium 9 becomes low. For this reason, as described above, the upper limit of the pore size of the filter medium is preferably 100 $\mu$m from the viewpoint of attaining the dispersing effect.

The addition of a stabilizer or a surfactant, such as an emulsifying agent, in such an amount as to have a concentration of at least about 0.02 times that of the solution concentration, enhances the dispersibility of the oil droplets and, at the same time, prevents recoalescence of oil droplets after dispersion in the filter section 8.

Further, it is noted that in the above construction of the present invention, large oil droplets are eliminated after the dispersion to a smaller size by the filter medium 9, and that there is no risk of oil droplets staying on the filter medium 9, enabling the service life of the filter medium 9 to be prolonged and, at the same time, preventing the lowering in flow rate with time. Furthermore, the diameter of oil droplets treated as such can be kept without change for a considerable period of time (for example, at least 18 hours, preferably 18 hours to 180 hours).

In addition to the above arrangement, the filter section 8 may be disposed between the tank 4 and the tank 5 (FIG. 1). This arrangement can offer an advantage with respect to minimizing the formation of cake on the filter surface, since cake formation causes a rapid pressure in the system. Exchanging the filter will then be possible without stopping the coating process as the diameter of the oil droplets can be kept in tank 5 without change for a long period of tome.

The invention will now be described in further detail by the following example, which should not be construed as limiting the invention in any way.

EXAMPLE

Silver halide photographic emulsions respectively having viscosities of about 37 cP and about 73 cP were fed at a flow rate of from 66 to 684 $cc/cm^2$.min and a pressure of from 0.5 to 7.0 bar into a liquid feeding system as shown in FIGS. 1 and 2.

Figure 4:
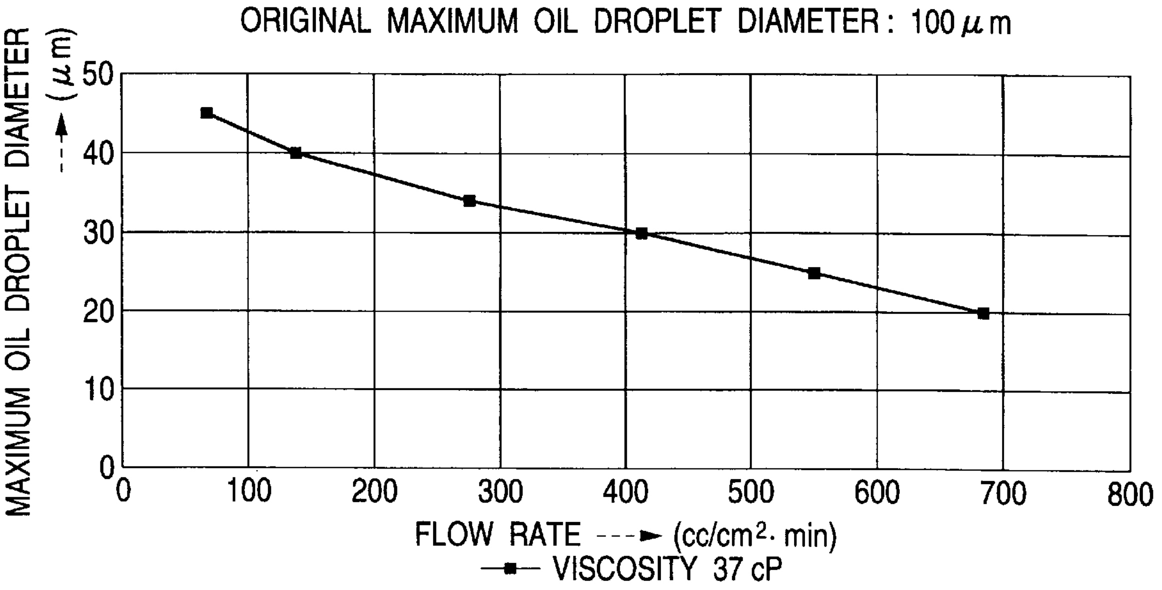
FIGS. 4 and 5 are graphs showing the relationship between the flow rate of the solution in the dispersing device shown in FIG. 2 and the maximum particle diameter of oil droplets after the dispersing treatment according to the present invention.
Figure 5:
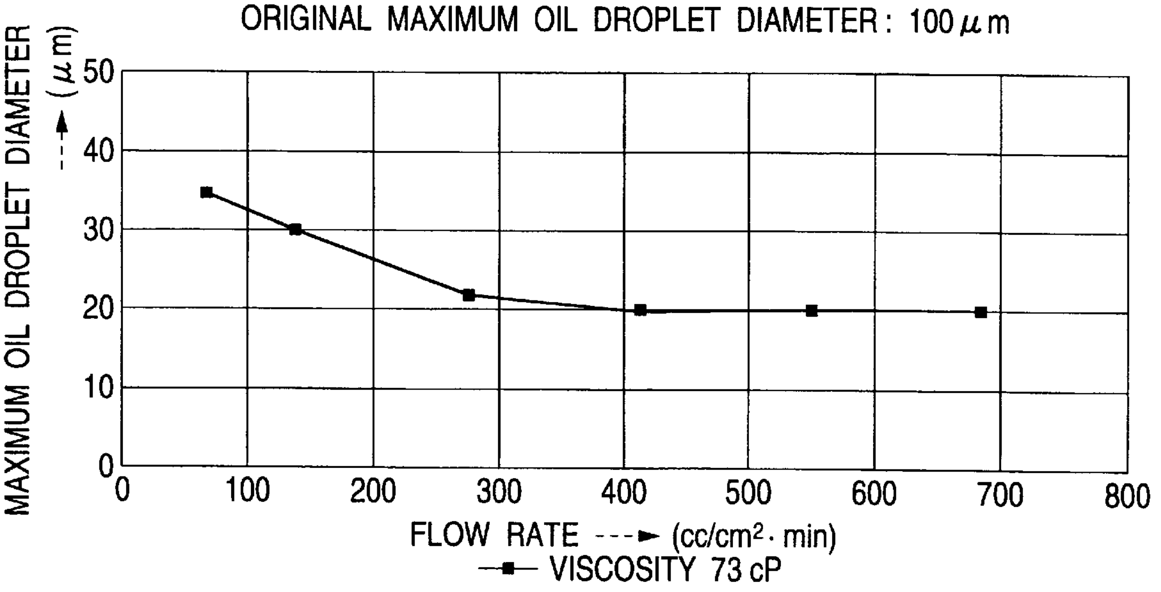
Figure 6:
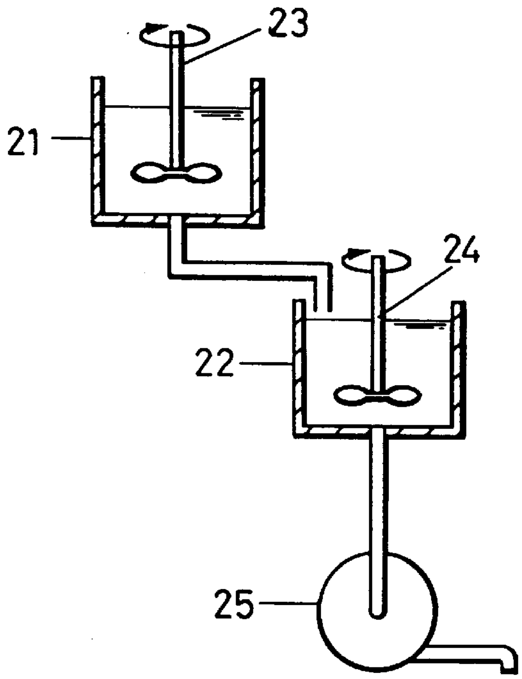
FIG. 6 PRIOR ART
FIGS. 6 and 7 are schematic diagrams illustrating conventional emulsification methods.
Figure 7:
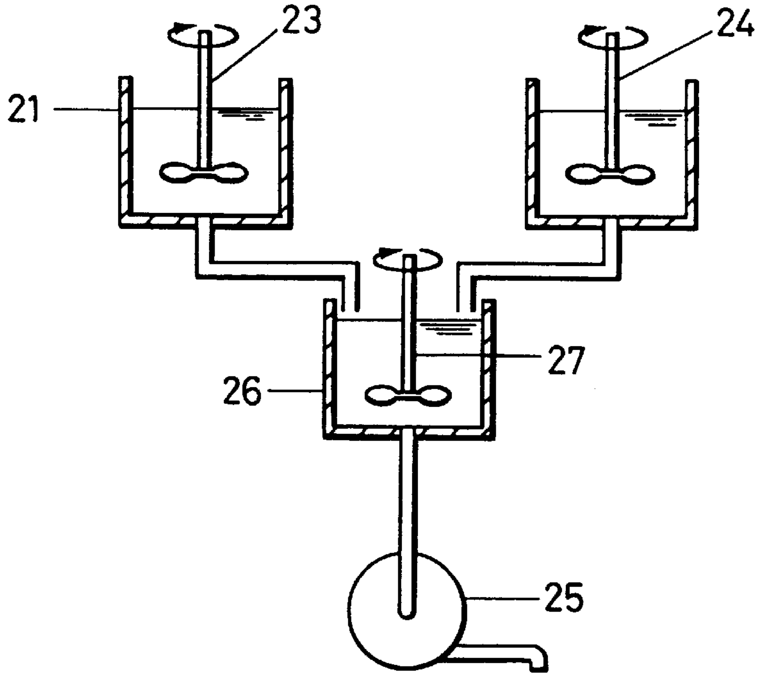
FIG. 7 PRIOR ART

FIGS. 4 and 5 are graphs showing the relationship between the flow rate of the emulsion while passing through the filter section 8 as shown in FIG. 2 and the maximum oil droplet diameter after the dispersing treatment according to the present invention.

FIG. 4 shows the results of an experiment wherein a silver halide photographic emulsion having a viscosity of about 37 cP was fed into the filter section 8, and FIG. 5 shows the results of an experiment wherein a silver halide photographic emulsion having a viscosity of about 73 cP was fed into the filter section 8. In FIG. 4 in order to attain a maximum oil droplet diameter of 30 $\mu$m, the flow rate should be at least 414 $cc/cm^2$.min, while in FIG. 5, the flow rate of 414 $cc/cm^2$.min can realize a maximum oil droplet diameter of 20 $\mu$m. From this, it can be said that the shear force created at the time of passing the solution through the filter medium 9 is most closely related to the reduction in diameter of the oil droplets. This can be understood also from the fact that, under the same flow rate and temperature conditions, the shearing force created at the time of passing the solution through the filter medium 9 is proportional to the viscosity of the solution.

Silver halide photographic emulsions dispersed in a liquid feeding system under suitable conditions were coated onto a support 3. The resultant photographic materials had a high quality and caused no troubles derived from large oil droplets.

Having described our invention as related to the embodiment shown in the accompanying drawing, it is our intention that the invention be not limited by any of the details of the description, unless otherwise specified, but rather be construed broadly within its spirit and scope as set out in the accompanying claims.

What is claimed is:

1. A method for dispersing an oil droplet emulsified material contained in an aqueous dispersing medium within a liquid feeding system comprising passing the medium having the oil droplet emulsified material contained therein through a filter with a plurality of pores at a flow rate of not less than 5 $cc/cm^2$.min, wherein the pores have such a size as to effect a reduction of the diameter of coarse particles of the oil droplet emulsified material to below a predetermined particle diameter. and wherein the filter comprises fibers and has a porosity of not less than 90%.

2. The method according to claim 1, wherein said filter has a thickness which is at least 10 times the average diameter of said pores.

3. The method according to claim 1, wherein said filter has a filtered particle size between 1 and 100 $\mu$m.

4. The method according to claim 1, wherein said dispersing medium contains a hydrophilic protective colloid.

5. The method according to claim 1 or 4, wherein said filter has a thickness which is at least 10 times the average diameter of said pores.

6. The method according to claim 5, wherein said filter has a filtered particle size between 1 and 100 μm.

7. The method according to claim 1 or 4, wherein said filter has a filtered particle size between 1 and 100 μm.

8. The method according to claim 1 or 4, wherein the filter comprises at least one of synthetic fibers, glass fibers, and cellulose fibers.

9. The method according to claim 1 or 4, wherein the dispersing medium is a medium for producing a photographic layer.

10. The method according to claim 1 or 4, wherein said dispersing medium is a gelatin-containing aqueous liquid.

11. The method according to claim 10, wherein said dispersing medium which has been passed through said filter is optionally stored for a period of time and is then applied onto a base material in producing a photographic product.

12. A method of coating a base with a dispersing medium containing an oil droplet type emulsified material for a photographic material, which comprises passing said dispersing medium through a filter with a plurality of pores having such a size as to permit an oil droplet type emulsified material having a predetermined diameter to pass therethrough by applying a pressure between 0.5 and 7.0 bar to said dispersing medium, and then coating said dispersing medium passed through the filter on a base for the photographic material, wherein the filter comprises fibers and has a porosity of not less than 90%.

13. The coating method according to claim 12, wherein said dispersing medium is a gelatin-containing aqueous liquid.

14. The coating method according to claim 12, wherein said filter has a thickness which is at least 10 times the average diameter of said pores.

* * * * *